United States Patent
Furui

(10) Patent No.: US 6,820,911 B2
(45) Date of Patent: Nov. 23, 2004

(54) VEHICLE REAR SEAT POSITION CHANGING DEVICE

(75) Inventor: Takayuki Furui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/402,822

(22) Filed: Mar. 28, 2003

(65) Prior Publication Data

US 2003/0184112 A1 Oct. 2, 2003

(30) Foreign Application Priority Data

Mar. 29, 2002 (JP) ........................................ 2002-095530

(51) Int. Cl.⁷ ................................................ B60N 2/02
(52) U.S. Cl. ................................ 296/65.01; 296/65.09; 701/49
(58) Field of Search ............................... 296/65.01, 69, 296/65.09, 65.13, 65.14, 65.11, 65.12, 64, 65.03, 65.16; 701/49, 45; 318/568.1, 626

(56) References Cited

U.S. PATENT DOCUMENTS

| | | | | | |
|---|---|---|---|---|---|
| 4,227,736 | A | * | 10/1980 | Lebault et al. | 296/65.09 |
| 4,660,140 | A | * | 4/1987 | Illg | 701/49 |
| 4,669,780 | A | * | 6/1987 | Sakakibara et al. | 296/65.16 |
| 4,682,088 | A | * | 7/1987 | Sullivan | 318/568.1 |
| 4,809,180 | A | * | 2/1989 | Saitoh | 701/49 |
| 4,932,709 | A | * | 6/1990 | Wainwright | 296/65.09 |
| 5,195,795 | A | * | 3/1993 | Cannera et al. | 296/65.09 |
| 5,269,581 | A | * | 12/1993 | Odagaki et al. | 295/65.09 |
| 5,605,368 | A | * | 2/1997 | Noma et al. | 296/65.13 |
| 5,948,031 | A | * | 9/1999 | Jinno et al. | 701/45 |
| 6,295,603 | B1 | * | 9/2001 | Mischo | 713/2 |
| 6,382,604 | B2 | * | 5/2002 | St. Clair | 701/49 |
| 6,401,021 | B1 | * | 6/2002 | Scally et al. | 296/65.01 |
| 6,406,084 | B1 | * | 6/2002 | de Campos et al. | 296/65.09 |
| 6,583,596 | B2 | * | 6/2003 | Nivet et al. | 318/626 |
| 6,609,745 | B2 | * | 8/2003 | Miyahara et al. | 296/65.13 |
| 6,612,614 | B2 | * | 9/2003 | Wolfe | 280/735 |
| 6,626,481 | B2 | * | 9/2003 | Kawasaki | 296/65.09 |
| 6,648,392 | B2 | * | 11/2003 | Fourrey et al. | 296/65.09 |
| 2001/0001526 | A1 | * | 5/2001 | Moon et al. | 296/65.09 |
| 2003/0075964 | A1 | * | 4/2003 | Piaulet et al. | 297/362.11 |
| 2003/0182043 | A1 | * | 9/2003 | Christiansen et al. | 701/49 |

FOREIGN PATENT DOCUMENTS

JP          63-284043          11/1988

* cited by examiner

*Primary Examiner*—Kiran Patel
(74) *Attorney, Agent, or Firm*—Rankin, Hill, Porter & Clark LLP

(57) ABSTRACT

A memory switch of a rear seat position changing device is provided at a rear side door inside a passenger compartment. The memory switch has a reproduction switch and a return switch. The reproduction switch and the return switch are simultaneously operated to previously store information of a desired position mode detected with a plurality of sensors as reproduction position mode information in a rear seat control unit. To change first and second rear seats from a current position mode to the reproduction position mode, the reproduction switch is turned on for change into the reproduction position mode.

8 Claims, 14 Drawing Sheets

VEHICLE REAR SEAT POSITION CHANGING DEVICE

FIELD OF THE INVENTION

The present invention relates to a vehicle rear seat position changing device which allows multiple rows of rear seats arranged behind front seats to return to their desired positions.

BACKGROUND OF THE INVENTION

Some vehicles have first rear seats and second rear seats behind front seats for receiving six to seven passengers. This kind of vehicles can, for example, form a large space within the passenger compartment to put baggage therein by folding the first rear seats and the second rear seats, or improve the access to the second rear seats by folding the first rear seats.

However, the first and second rear seats themselves are relatively heavy loads, and require great operating force to manually fold the first and/or second rear seats to change the positions. It is additionally required in changing the positions of the first and/or second rear seats to manually change them while releasing the respective locks of the rear seats. This results in relatively long time to change the positions of the rear seats appropriately for the use of the vehicle, leaving room for improvement in that respect.

As means for solving the problem, there has been proposed a "Vehicle Rear Seat System" disclosed in Japanese Patent Laid-Open Publication No. SHO-63-284043, for example. This rear seat system is shown in FIG. 16.

The rear seat system shown in FIG. 16 has a first rear seat 101 and a second rear seat 102 arranged behind a front seat 100. The first rear seat 101 has an actuator 103 for sliding a seat cushion 101*a* longitudinally of the vehicle and an actuator 104 for swingingly moving the seat cushion 101*a* in a longitudinal direction of the vehicle. The first rear seat 101 further has an actuator 105 for swingingly moving its seatback 101*b* in a longitudinal direction of the vehicle.

The second rear seat 102 has an actuator 106 for swingingly moving a seatback 102*b* in a longitudinal direction of the vehicle.

A controller 108 for controlling these actuators 103 to 106 is provided at an instrument panel 109 of the vehicle. The controller 108 is a mode selection switch for changing the position mode of the first and second rear seats 101 and 102. The operation of the mode selection switch 108 brings the actuators 103 to 106 provided at the first and second rear seats 101 and 102 into operation, changing the first and second rear seats 101 and 102 into a desired position mode.

However, since the mode selection switch 108 is provided at the instrument panel 109, an operator 110 performs the operation of changing the first and/or second rear seats 101, 102 into desired positions, seeing the mode selection switch 108. It is thus required to check the motions of the first and/or second rear seats 101, 102 while seeing the mode selection switch 108, leaving room for improvement in terms of usability.

The "Vehicle Rear Seat System" of Japanese Patent Laid-Open Publication No. SHO-63-284043 also presents an example of providing first and second switch boards not shown in FIG. 16 at the first and second rear seats 101 and 102, respectively.

The first switch board has, for example, a slide drive mechanism control switch for sliding the first rear seat 101 in a longitudinal direction of the vehicle and a reclining drive mechanism control switch for reclining the first rear seat.

The second switch board has, for example, a reclining drive mechanism control switch for reclining the second rear seat 102.

By manually operating the slide drive mechanism control switch and the reclining drive mechanism control switch of the first switch board, the first rear seat 101 is changed into a desired position. By manually operating the reclining drive mechanism control switch of the second switch board, the second rear seat 102 is changed into a desired position.

The provision of the first switch board at the first rear seat 101 and the provision of the second switch board at the second rear seat 102 allow the operator 110 to check the motions of the first and/or second rear seats 101, 102 while operating the respective control switches.

In the normal use of the vehicle, the first and second rear seats 101 and 102 are generally used in a position mode shown in FIG. 16 (hereinafter referred to as a "normal mode"). At the end of use of the vehicle for temporary use other than the normal use with the position mode of the first and second rear seats 101 and 102 appropriately changed for the temporary use, the position mode of the first and second rear seats 101 and 102 is often returned to the normal mode.

It is also required to manually operate the first and second switch boards to return the first and second rear seats 101 and 102 into the normal mode. At that time, the first and second switch boards are operated while the motions of the first and second rear seats 101 and 102 are visually checked. When the rear seats 101 and 102 are returned to the normal mode, the operation of the first and second switch boards is released.

As just described, in order to return the first and second rear seats 101 and 102 into the normal mode using the first and/or second switch boards, it is required to simultaneously perform both the work of operating the first and second switch boards and the work of visually checking the motions of the first and second rear seats 101 and 102. The returning operation of the first and second rear seats 101 and 102 thus takes time, leaving room for improvement in this respect.

It is thus desired to allow returning multiple rows of rear seats to their desired positions while checking the motions of the rear seats.

SUMMARY OF THE INVENTION

According to one aspect of the present invention, there is provided a rear seat position changing device for a vehicle with multiple rows of rear seats as a first rear seat and a second rear seat arranged behind front seats, having actuators for changing the position of each row of rear seats, having a plurality of sensors for detecting the position of each row of rear seats, and having a control unit for controlling the actuators based on information from the sensors, which vehicle rear seat position changing device comprises: a memory switch provided in the vicinity of the first or second rear seat; wherein, when the first and second rear seats are arranged in a desired position mode, the memory switch is operated to store information of the desired position mode detected by the plurality of sensors in the control unit as reproduction position mode information; to change the first and second rear seats from a current position mode to the desired position mode, the memory switch is operated to detect the current position mode with the plurality of sensors for storage in the control unit as current position mode information; and the actuators are driven with the control unit in accordance with the reproduction position mode information stored in the control unit to change the positions of the first and second rear seats from the current position mode to the desired position mode.

To return the first and second rear seats from the desired position mode to the current position mode, the memory switch is operated to read the current position mode information stored in the control unit and drive the actuators with the control unit according to the current position mode information, thereby to return the positions of the first and second rear seats from the desired position mode to the current position mode.

The memory switch is preferably provided at the inside of a rear side door of the vehicle. The memory switch comprises a reproduction switch for changing the plurality of rear seats from the current position mode to the desired position mode and a return switch for returning from the desired position mode to the current position mode.

Thus in the present invention, when the first and second rear seats are in a desired position mode, information of the desired position mode is previously stored as reproduction position mode information. To change the first and second rear seats from a current position mode to the desired position mode, current position mode information is first read. Then the previously stored reproduction position mode information is read and the first and second rear seats are changed to the desired position mode according to the reproduction position mode information. As described above, the memory switch comprising the reproduction switch and the return switch is operated to change the first and second rear seats to the desired position mode. This eliminates the need for visually checking the motions of the first and second rear seats while operating the memory switch.

The provision of the memory switch in the vicinity of the first and second rear seats allows the control of the first and second rear seats in the vicinity of the rear seats.

The control of the first and second rear seats in the vicinity of the rear seats allows an operator to easily check the motions of the first and second rear seats while operating the memory switch.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Initial reference is made to FIGS. 1 to 9 illustrating a rear seat position or attitude changing device according to a first embodiment of the present invention.

Figure 1:
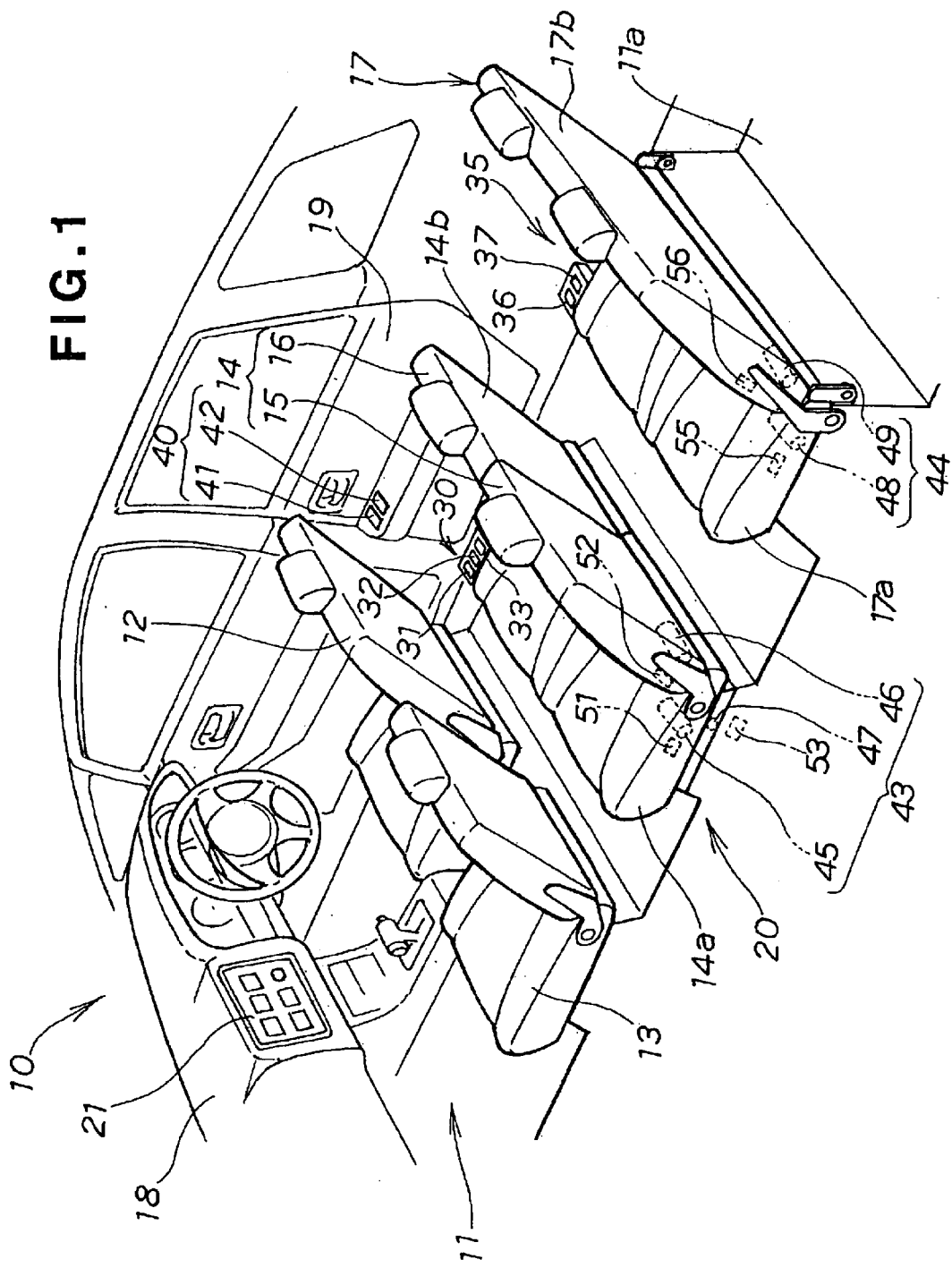
FIG. 1 is a perspective view, taken from inside a passenger compartment, of a vehicle having a rear seat position changing device according to a first embodiment of the present invention.

As shown in FIG. 1, a vehicle 10 has, within a passenger compartment 11, front seats of a driver seat 12 and a passenger seat 13, a first rear seat 14 arranged behind the front seats, a second rear seat 17 arranged behind the first rear seat 14, and a rear seat position changing device 20 for changing the positions or attitudes of the first rear seat 14 and the second rear seat 17.

The first rear seat 14 has left and right seats 15 and 16 separate from one another. The second rear seat 17 is a transversely-integral bench seat. The first embodiment will be described with the second rear seat 17 as a seat consisting of a seat cushion 17a and a seatback 17b for ease of understanding.

Figure 2:
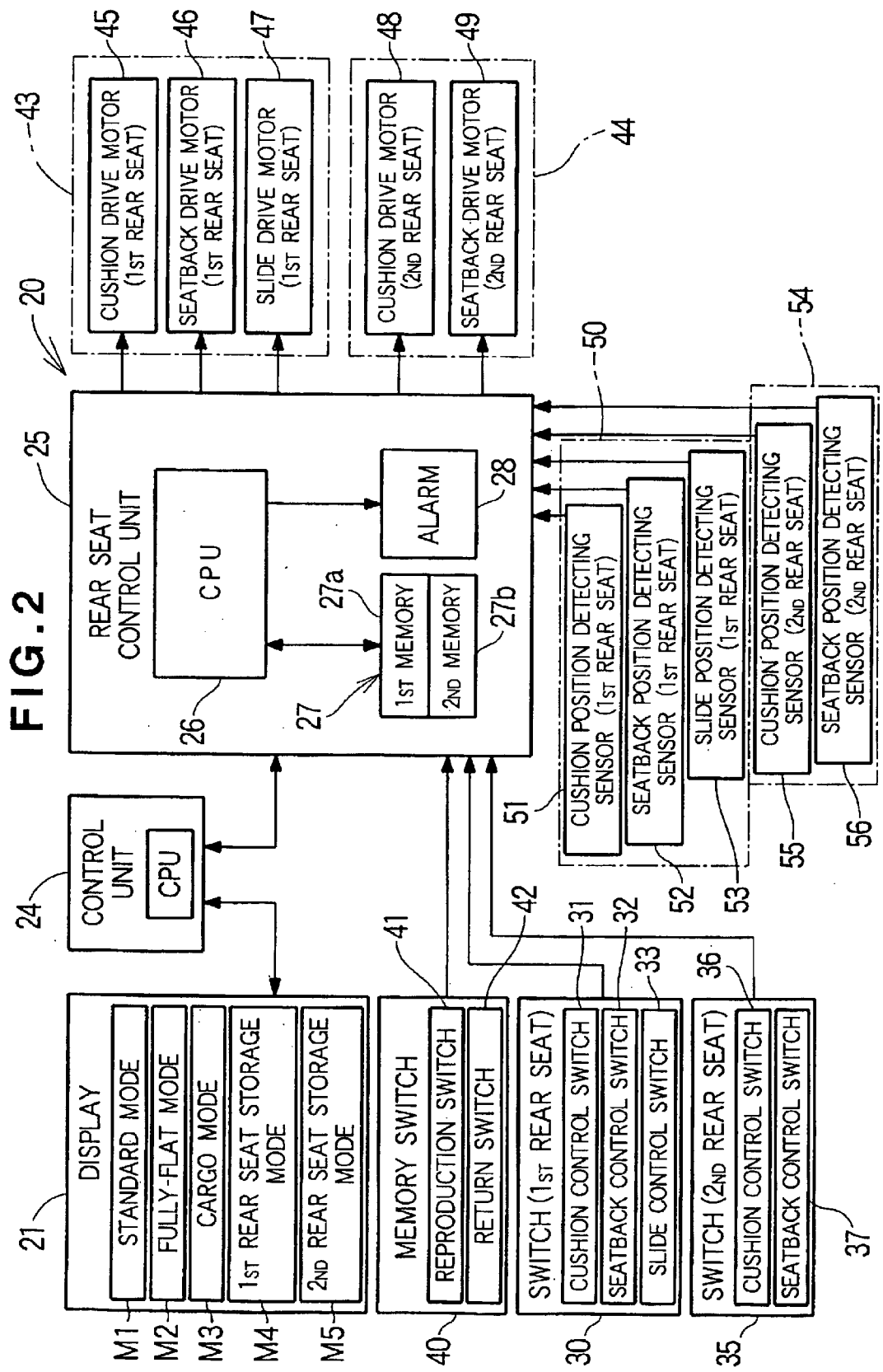
FIG. 2 is an electric functional block diagram of the rear seat position changing device shown in FIG. 1.

FIG. 2 illustrates an electric functional block diagram of the rear seat position changing device 20.

The rear seat position changing device 20 has a display (position mode selector 21), a rear seat control unit 25, a first controller 30, a second controller 35, a memory switch (memory controller) 40, a first rear seat driving means 43, a second rear seat driving means 44, a first rear seat position detecting means 50, and a second rear seat position detecting means 54.

The display 21 displays a plurality of previously recorded position modes of the first rear seat 14 and the second rear seat 17. The display 21 is connected to the rear seat control unit 25 via a control unit 24.

The rear seat control unit 25 has a CPU 26, a memory 27 for storing a signal outputted from the CPU 26, and an alarm unit 28 for sounding the alarm (e.g., buzzer) according to a signal outputted from the CPU 26. The memory 27 has a first memory 27a and a second memory 27b.

The first controller 30, second controller 35 and memory switch 40 output control signals to the rear seat control unit 25.

The first controller 30 has a first rear seat cushion control switch 31, a first rear seat seatback control switch 32, and a first rear seat slide control switch 33.

Operating the first rear seat cushion control switch 31 inputs a control signal to the CPU 26 of the rear seat control unit 25. In accordance with the control signal, a first rear seat cushion drive motor (actuator) 45 of the first rear seat driving means 43 is driven.

Upon operation of the first rear seat seatback control switch 32, the control signal is inputted to the CPU 26 of the rear seat control unit 25. In accordance with the control signal, a first rear seat seatback drive motor (actuator) 46 of the first rear seat driving means 43 is driven.

Upon operation of the first rear seat slide control switch 33, the control signal is inputted to the CPU 26 of the rear seat control unit 25. In accordance with the control signal, a first rear seat slide drive motor (actuator) 47 of the first rear seat driving means 43 is driven.

The second controller 35 has a second rear seat cushion control switch 36 and a second rear seat seatback control switch 37.

Upon operation of the second rear seat cushion control switch 36, the control signal is inputted to the CPU 26 of the rear seat control unit 25. In accordance with the control signal, a second rear seat cushion drive motor (actuator) 48 of the second rear seat driving means 44 is driven.

Upon operation of the second rear seat slide control switch 37, the control signal is inputted to the CPU 26 of the rear seat control unit 25. In accordance with the control signal, a second rear seat seatback drive motor (actuator) 49 of the second rear seat driving means 44 is driven.

The first rear seat position detecting means 50 has a first rear seat cushion position detection sensor 51, a first rear seat seatback position detection sensor 52, and a first rear seat slide position detection sensor 53.

The second rear seat position detecting means 54 has a second rear seat cushion position detection sensor 55 and a second rear seat seatback position detection sensor 56.

As shown in FIG. 1, the memory switch 40 has a playback or reproduction switch 41 and a return switch 42 provided in the vicinity of the first rear seat 14 and the second rear seat 17, that is, provided at an interior wall of a rear side door 19 facing the passenger compartment 11.

When the reproduction switch 41 and the return switch 42 of the memory switch 40 are simultaneously operated after the first rear seat 14 and the second rear seat 17 are changed to a desired position or attitude mode, information of the desired position mode (reproduction or playback mode) detected by the sensors 51, 52, 53, 55 and 56 is stored as reproduction position mode information in the first memory 27a of the rear seat control unit 25.

To change the first rear seat 14 and the second rear seat 17 from a current position mode to the reproduction position mode, the reproduction switch 41 of the memory switch 40 is first operated. When the reproduction switch 41 is turned on, the current position mode is detected by the sensors 51, 52, 53, 55 and 56, and is read as current position mode information into the rear seat control unit 25. The information is stored in the second memory 27b. Thereafter, the reproduction position mode information is read from the first memory 27a, and the first and second rear seats 14 and 17 are changed to the reproduction position mode based on the read current position mode information.

To return from the reproduction position mode to the current position mode, the return switch 42 of the memory switch 40 is operated. When the return switch 42 is turned on, the current position mode information stored in the second memory 27b is read and the actuators 45, 46, 47, 48 and 49 are driven appropriately for the current position mode. The position mode of the first and second rear seats 14 and 17 is thus returned from the reproduction position mode to the current position mode.

The switching from the current position mode to the reproduction position mode will be described in detail. A reproduction or playback signal generated by operating the reproduction switch 41 is inputted to the CPU 26 of the rear seat control unit 25. A signal appropriate for the positions of the first and second rear seats 14 and 17 stored in the first memory 27a of the memory 27 activates any of the first rear seat cushion drive motor 45, the first rear seat seatback drive motor 46, the first rear seat slide motor 47, the second rear seat cushion drive motor 48 and the second rear seat seatback drive motor 49 to put the first and second rear seats 14 and 17 back from the current position mode to the reproduction position mode ("reproduction mode").

Next, the return mode to return from the reproduction position mode to the current position mode (that is, a position mode before turned into the reproduction position mode) will be described in detail. A return signal generated by operating the return switch 42 is inputted to the CPU 26 of the rear seat control unit 25. By turning the reproduction switch 41 on, a signal appropriate for the "current position mode" stored in the second memory 27b of the memory 27 activates any of the first rear seat cushion drive motor 45, the first rear seat seatback drive motor 46, the first rear seat slide motor 47, the second rear seat cushion drive motor 48 and the second rear seat seatback drive motor 49, returning the first and second rear seats 14 and 17 to the current mode positions.

The reproduction switch 41 and the return switch 42 of the memory switch 40 are operable before an ignition key (not shown) is operated.

That is, before a main switch is turned on by operating the ignition key, the positions of the first and second rear seats 14 and 17 can be changed from the "current position mode" to the "reproduction position mode" by operating the reproduction switch 41.

Further, before the main switch is turned on by operating the ignition key, the positions of the first and second rear seats 14 and 17 can be returned from the "reproduction position mode" to the "current position mode" by operating the return switch 42.

The fact that the reproduction switch 41 and the return switch 42 are operable before the ignition key is operated allows the operator to switch the positions of the first and second rear seats 14 and 17 to the "reproduction position mode" or return them to the "return position mode" as the current position mode (a position mode before switched into the reproduction position mode) only by opening the side door and operating the memory switch 40 without going up to the driver seat, improving the usability.

Reference is returned to FIG. 1 for description. The rear seat position changing device 20 has a display 21 at the center of the instrument panel 18. The first controller 30 is exemplarily arranged at the right of the first rear seat 14. The second controller 35 is arranged at the right of the second rear seat 17. The memory switch 40 is provided at the right rear side door 19. The first rear seat cushion drive motor 45 is provided in a seat cushion 14a of the first rear seat 14. The first rear seat seatback drive motor 46 is provided in a seatback 14b of the first rear seat 14. The first rear seat slide motor 47 is provided on the floor below the first rear seat 14. The second rear seat cushion drive motor 48 is provided in a seat cushion 17a of the second rear seat 17. The second rear seat seatback drive motor 49 is provided in a seatback 17b of the second rear seat 17.

The first rear seat cushion position detection sensor 51 is exemplarily provided in the seat cushion 14a of the first rear seat 14. The first rear seat seatback position detection sensor 52 is provided in the seatback 14b of the first rear seat 14. The first rear seat slide position detection sensor 53 is provided at the seat cushion 14a of the first rear seat 14. The second rear seat cushion position detection sensor 55 is provided in the seat cushion 17a of the second rear seat 17. The second rear seat seatback position detection sensor 56 is provided in the seatback 17b of the second rear seat 17.

The rear seat control unit 25 shown in FIG. 2 is exemplarily arranged below the second rear seat 17. The control unit 24 shown in FIG. 2 is exemplarily provided in the vicinity of the instrument panel 18.

Figure 3:
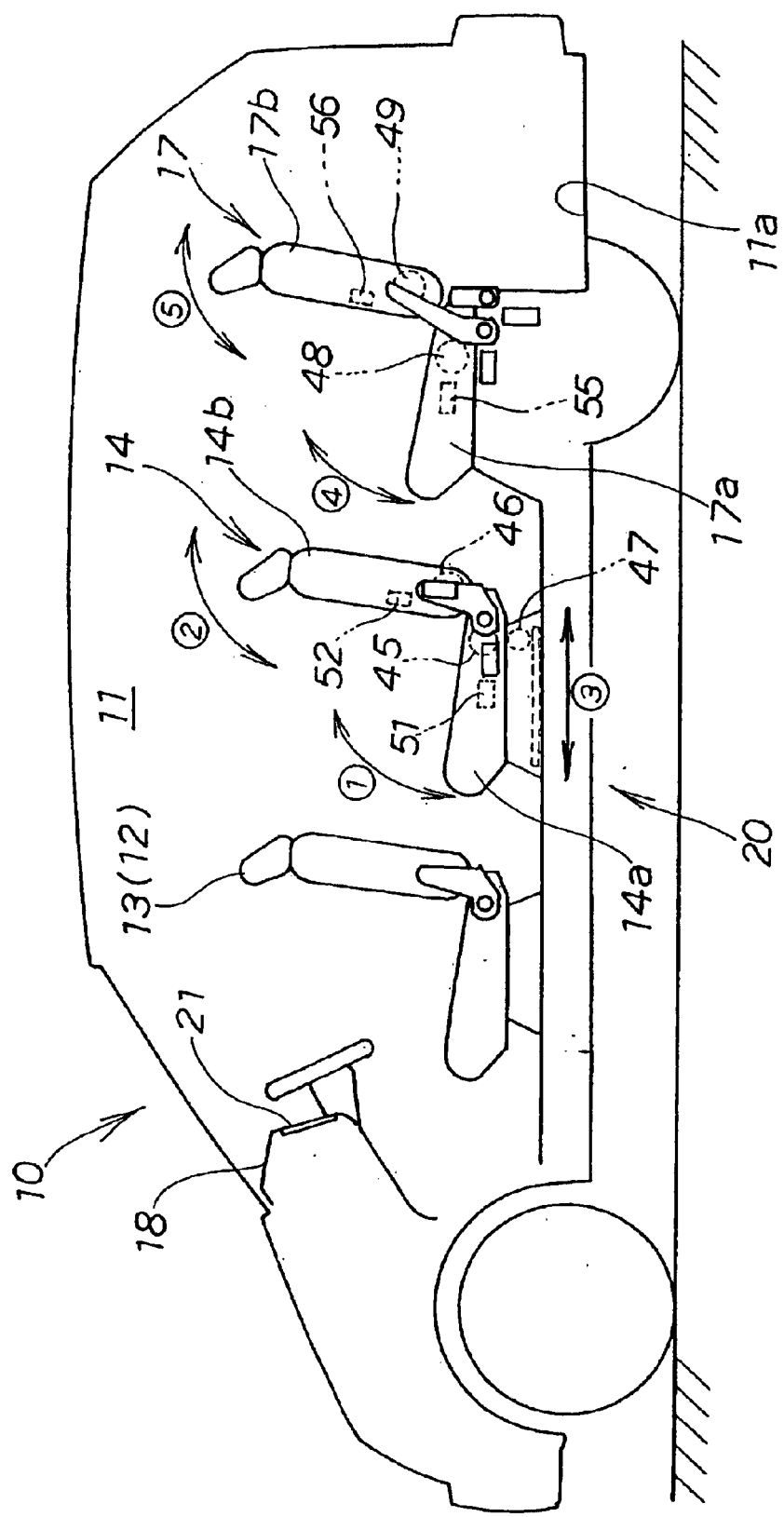
FIG. 3 is a side view of the vehicle shown in FIG. 1.

As shown in FIG. 3, driving the first rear seat cushion drive motor 45 causes the seat cushion 14a of the first rear seat 14 to swing longitudinally of the vehicle as shown by arrow ①.

When the first rear seat seatback drive motor 46 is driven, the seatback 14b of the first rear seat 14 swings longitudinally of the vehicle as shown by arrow ②.

Further, when the first rear seat slide motor 47 is driven, the first rear seat 14 slides longitudinally of the vehicle as shown by arrow ③.

When the second rear seat cushion drive motor 48 is driven, the seat cushion 17a of the second rear seat 17 swings longitudinally of the vehicle as shown by arrow ④.

When the second rear seat seatback drive motor 49 is driven, the seatback 17b of the second rear seat 17 swings longitudinally of the vehicle as shown by arrow ⑤.

Figure 4:
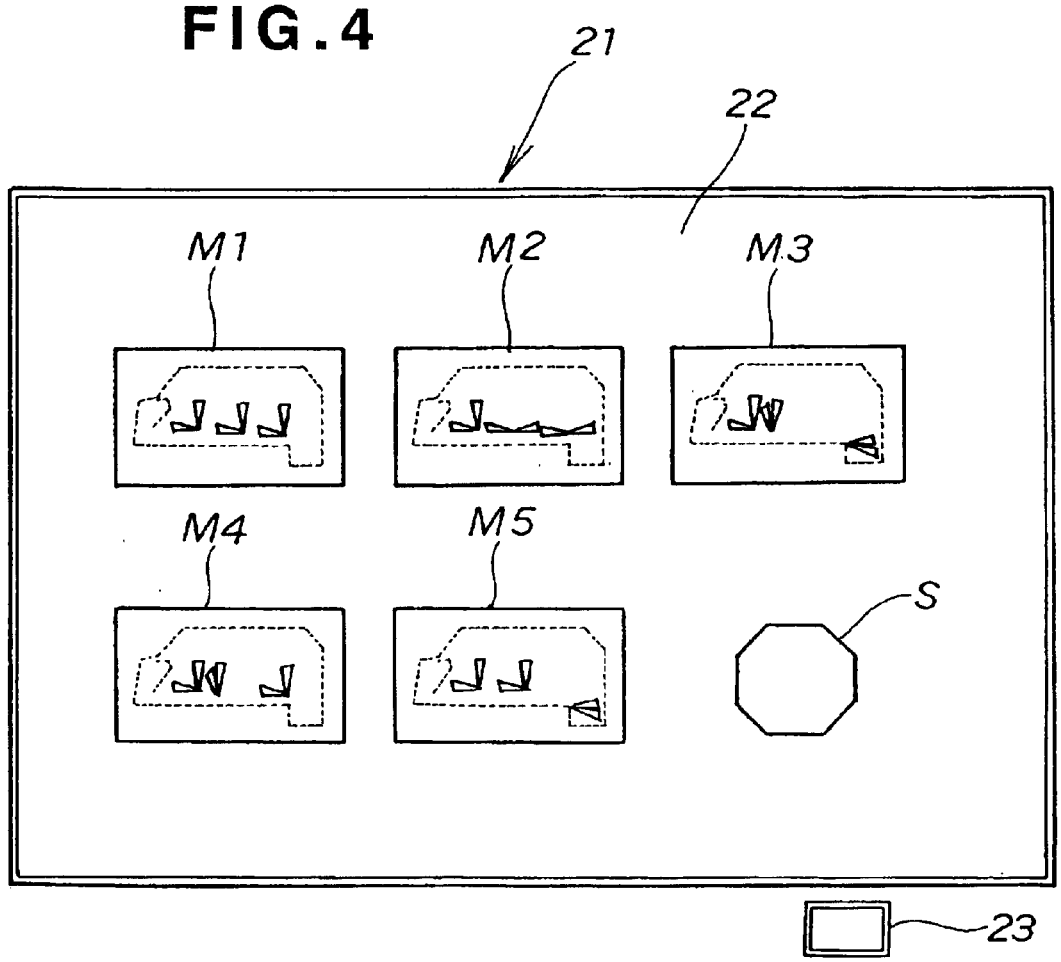
FIG. 4 is an enlarged diagram illustrating an example of a display shown in FIG. 1 displaying a plurality of position modes.

FIG. 4 illustrates the display 21 provided at the instrument panel.

The display 21 also serves as a display of a car navigator. A plurality of position modes of the first rear seat 14 and the second rear seat 17 shown in FIG. 3 is displayed on a display panel 22. In the illustrated example, five kinds of position modes, "normal mode" M1, "fully-flat mode" M2, "cargo mode" M3, "first rear seat storage mode" M4 and "second rear seat storage mode" M5, are switchably displayed.

The display 21 is switched between the display of car navigation and the display of position modes M1 to M5 of the first and second rear seats 14 and 17 by pressing a car navigator/position mode changeover switch 23. The car navigation is controlled by the control unit 24 shown in FIG. 2.

The display 21 is a touch panel which allows switching between position modes M1 to M5 by touching with a finger the display panel 22 displaying "normal mode" M, "fully-flat mode" M2, "cargo mode" M3, "first rear seat storage mode" M4 and "second rear seat storage mode" M5.

The display panel 22 of the display 21 has a "stop" switch S. Touching the stop switch S stops the motions of the first and second rear seats 14 and 17 during the change of the position mode between M1 to M5.

Now, with reference to FIG. 3 and FIGS. 5 to 8, each position mode will be described.

FIG. 3 illustrates the positions of "normal mode" M1 of the first and second rear seats 14 and 17, in which the first and second rear seats 14 and 17 are set in a normal state so as to allow passengers to sit in a normal position on the rear seats 14 and 17.

An example of changing from "normal mode" M1 to position modes M2 to M5, for example, will be described below.

Figure 5:
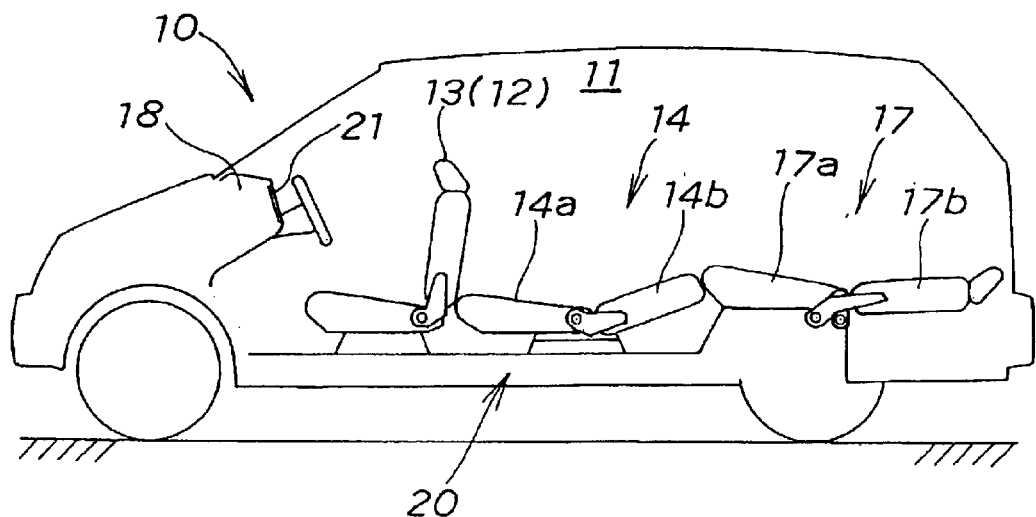
FIG. 5 is a side view of the vehicle, illustrating the state of a "fully-flat mode" shown in FIG. 4.

FIG. 5 illustrates the first and second rear seats 14 and 17 in "fully-flat mode" M2.

"Fully-flat mode" M2 is a mode in which the first and second rear seats 14 and 17 are flattened from the state of "normal mode" M1 shown in FIG. 3 by tilting the rear seatback 14b rearward with the first rear seat 14 slightly slid forward of the vehicle and tilting the seatback 17b of the second rear seat 17 rearward.

Figure 6:
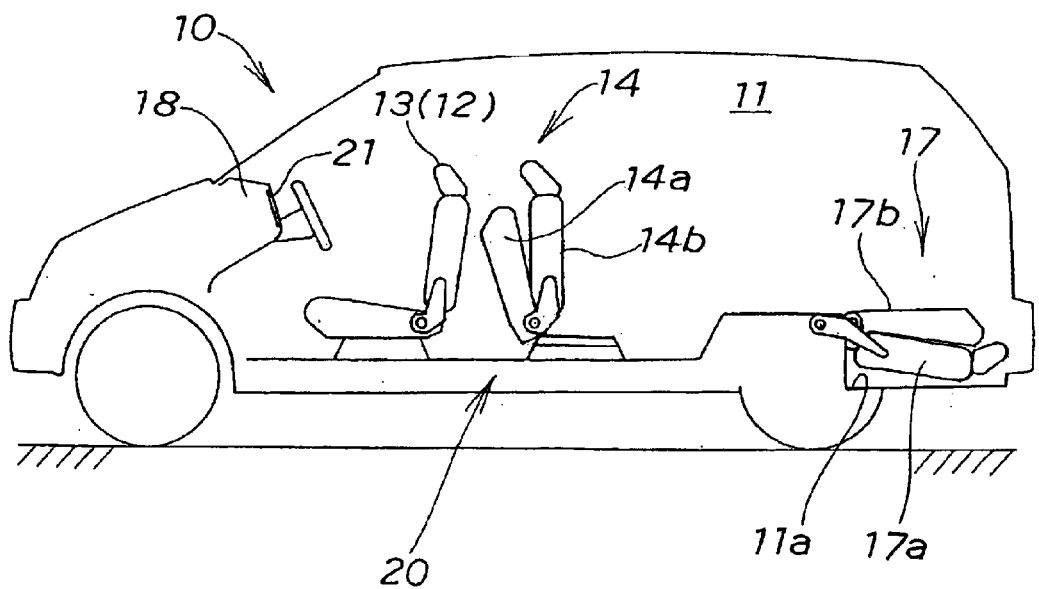
FIG. 6 is a side view of the vehicle, illustrating the state of a "cargo mode" shown in FIG. 4.

FIG. 6 illustrates the first and second rear seats 14 and 17 in "cargo mode" M3.

"Cargo mode" M3 is a mode in which a large space is provided within the passenger compartment 11 by, from the state of "normal mode" M1 shown in FIG. 3, swinging the seat cushion 14a of the first rear seat 14 toward the rear of the vehicle to fold the seat cushion 14a and the seatback 14b in a substantially V shape, sliding the first rear seat 14 in that state forward of the vehicle for storage in the vicinity of the front seats 12 and 13, and tilting the seatback 17b of the second rear seat 17 rearward of the vehicle and swinging the seat cushion 17a rearward of the vehicle to store the second rear seat 17 in a depressed portion 11a.

Figure 7:
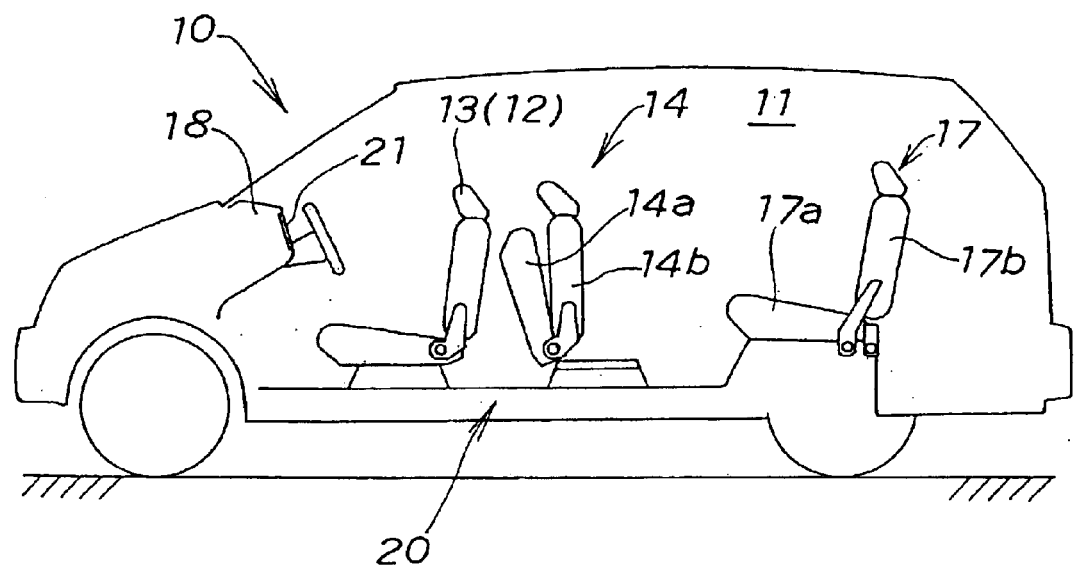
FIG. 7 is a side view of the vehicle, illustrating the state of a "first rear seat storage mode" shown in FIG. 4.

FIG. 7 illustrates the state of the "first rear seat storage mode" in which the first rear seat 14 is folded.

"First rear seat storage mode" M4 is a mode in which a large space is provided in front of the second rear seat 17 by, from the state of "normal mode" M1 shown in FIG. 3, swinging the seat cushion 14a of the first rear seat 14 rearward of the vehicle to fold the seat cushion 14a and the seatback 14b in a substantially V shape, and sliding the first rear seat 14 in this state forward of the vehicle for storage in the vicinity of the front seats 12 and 13.

Figure 8:
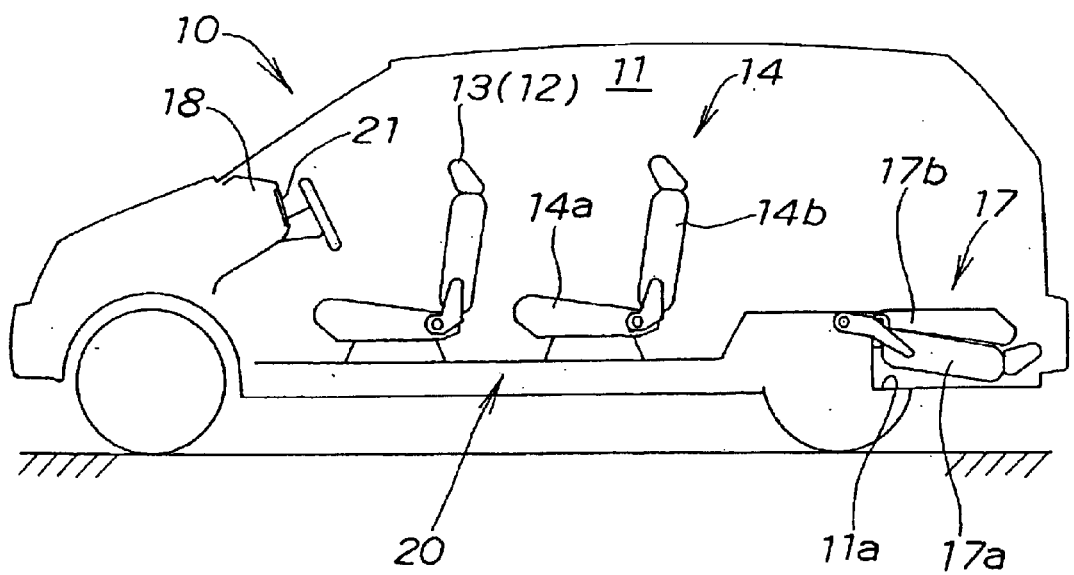
FIG. 8 is a side view of the vehicle, showing the state of a "second seat storage mode" shown in FIG. 4.

FIG. 8 illustrates the state of the "second rear seat storage mode" in which the second rear seat 17 is folded.

"Second rear seat storage mode" M5 is a mode in which a large space is provided behind the first rear seat 14 by, from the state of "normal mode" M1 shown in FIG. 3, tilting the seatback 17b of the second rear seat 17 rearward of the vehicle and swinging the seat cushion 17a rearward of the vehicle for folding, and storing the second rear seat 17 in this state in the depressed portion 11a.

Now, with reference to FIGS. 1, 2, 9A and 9B, an example of switching the position mode of the first and second rear seats 14 and 17 from "normal mode" M1 to "fully-flat mode" M2 will be described.

Figure 9A:
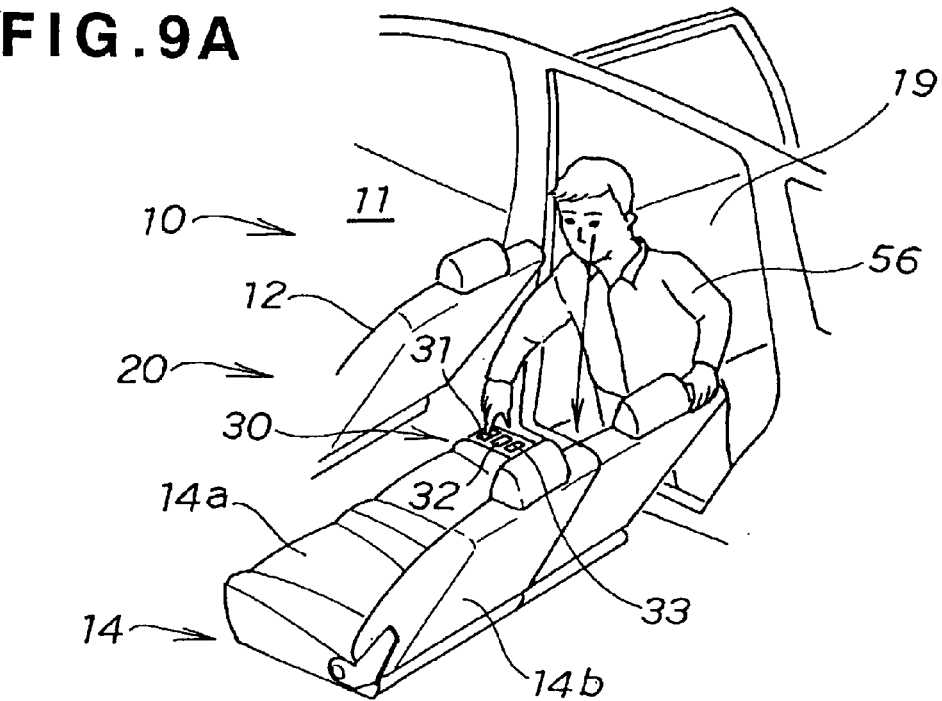
FIGS. 9A and 9B are diagrams illustrating an example of changing the first and second rear seats to the positions of the "fully-flat mode" with a rear side door opened.

In FIG. 9A, an operator 56 operates a switch of the first controller 30 of the first rear seat 14.

A control signal generated by turning on the first rear seat slide control switch 33 of the first controller 30 is inputted to the CPU 26 of the rear seat control unit 25 shown in FIG. 2. In accordance with the control signal, the first rear seat slide motor 47 is driven.

The driving of the first rear seat slide motor 47 shown in FIG. 2 moves the first rear seat 14 toward the front of the vehicle by a predetermined amount. When the first rear seat 14 moves forward by the predetermined amount, the first rear seat slide control switch 33 is turned off to stop the first rear seat 14.

Then, a control signal generated by turning on the first rear seat seatback control switch 32 is inputted to the CPU 26 of the rear seat control unit 25 shown in FIG. 2. In accordance with the control signal, the first rear seat seatback drive motor 46 is driven.

The driving of the first rear seat seatback drive motor 46 shown in FIG. 2 causes the seatback 14b of the first rear seat 14 to swing toward the rear of the vehicle. When the seatback 14b swings rearward by a predetermined amount, the first rear seat seatback control switch 32 is turned off to stop the seatback 14b of the first rear seat 14.

Figure 9B:
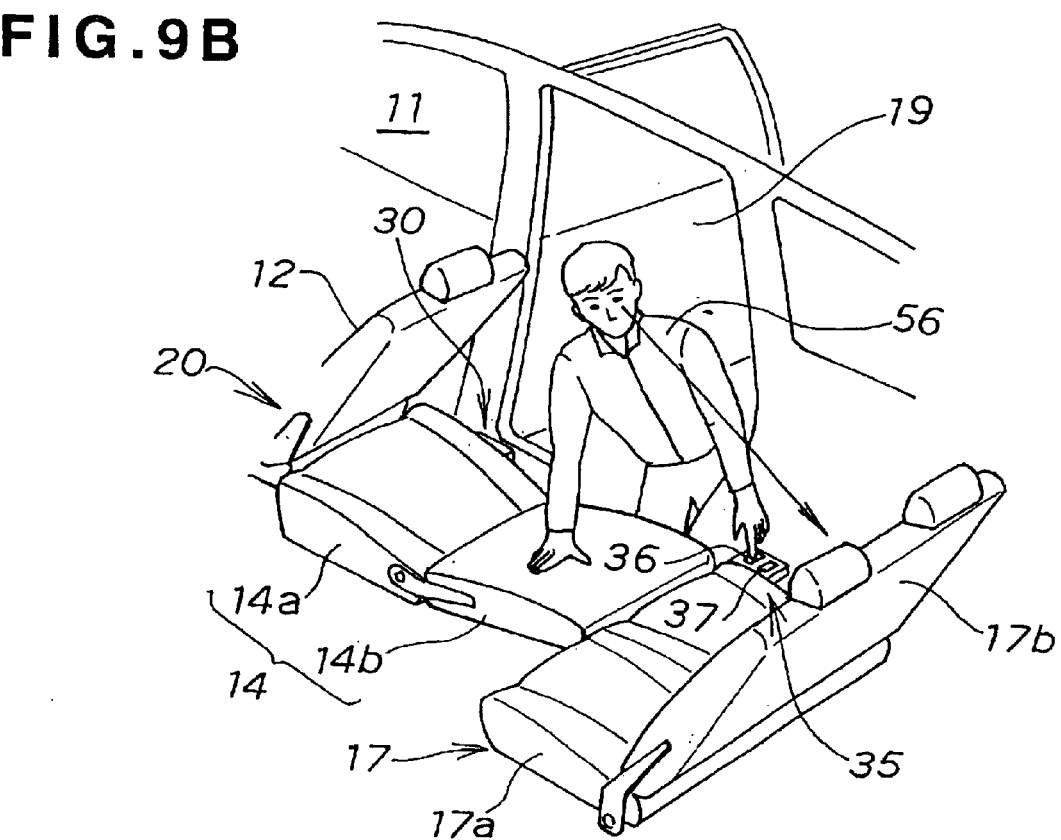

Then, as shown in FIG. 9B, the operator 56 turns on the second controller 35 of the second rear seat 17.

A control signal generated by turning on the second rear seat seatback control switch 37 of the second controller 35 is inputted to the CPU 26 of the rear seat control unit 25 shown in FIG. 2. In accordance with the control signal, the second rear seat seatback drive motor 49 is driven.

The driving of the second rear seat seatback drive motor 49 shown in FIG. 2 causes the seatback 17b of the second rear seat 17 to swing rearward of the vehicle. When the seatback 17b swings rearward by a predetermined amount, the second rear seat seatback control switch 37 is turned off to stop the seatback 17b of the second rear seat 17.

In this manner, the positions of the first and second rear seats 14 and 17 are changed from "normal mode" Ml shown in FIG. 3 to "fully-flat mode" M2 shown in FIG. 5.

Now, with reference to FIGS. 1, 2 and 10 to 13, an example of using the memory switch 40 for the position mode of the first and second rear seats 14 and 17 to set a reproduction position mode, change to the reproduction position mode and return to a current position mode will be described. Description will be made with a current position mode of the first and second rear seats 14 and 17 as "fully-flat mode" M2 and with a reproduction position mode as "normal mode" M1, for example.

Figure 10:
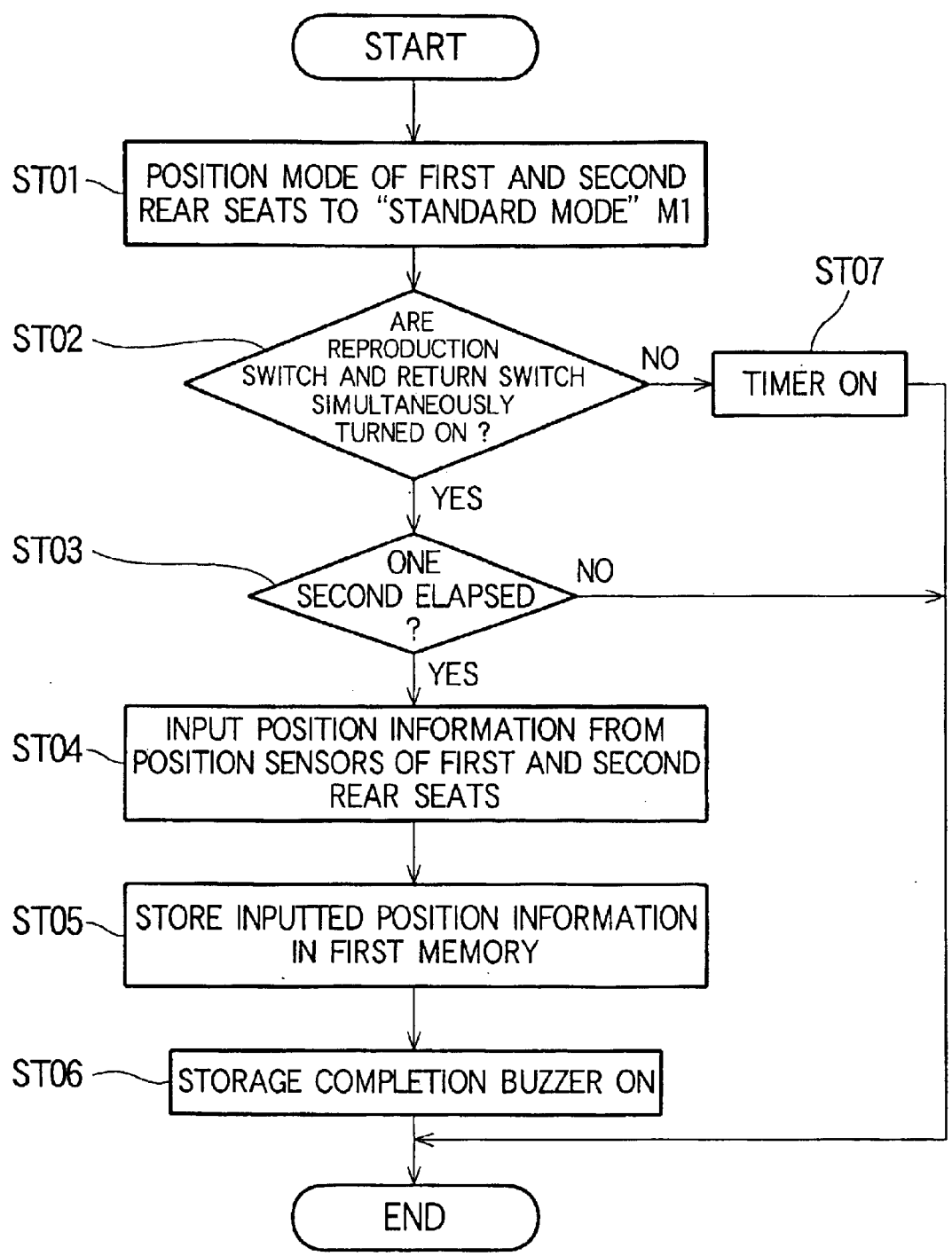
FIG. 10 is a flowchart illustrating an example of storing a desired position mode of the first and second rear seats with a memory switch of the rear seat position changing device of the present invention.

FIG. 10 is a flowchart illustrating an example of storing the position mode of the first and second rear seats with the memory switch.

Step (hereinafter abbreviated as ST) 01: "normal mode" M1 is selected as the positions of the first and second rear seats 14 and 17. For example, a displayed portion of normal mode Ml on the display 21 shown in FIG. 4 is touched.

ST02: the reproduction switch 41 and the return switch 42 of the memory switch 40 shown in FIG. 1 are simultaneously pressed. It is determined whether both of the switches 41 and 42 are turned on. When the switches 41 and 42 are on, the process proceeds to ST03. When the switches 41 and 42 are not on, the process proceeds to ST07 in which a timer starts. When a predetermined time has elapsed, the flow is terminated. That is, when the memory switch 40 has been left without being operated for the predetermined time since normal mode M1 was selected in ST01, it is assumed that there is no intention of storing normal mode M1, and the flow is terminated.

ST03: it is determined whether or not both of the reproduction switch 41 and the return switch 42 have been on for one second. When they have been on for one second, it is assumed that it is intended to store the position mode selected in ST01, and the process proceeds to ST04. That is, the reproduction switch 41 and the return switch 42 are pressed simultaneously until one second has elapsed. When the pressing is stopped within one second, the flow terminates, assuming that there is no intention of storing the selected position mode.

ST04: the position detection sensors 51, 52, 53, 55 and 56 shown in FIG. 1 detect the positions of the first and second rear seats 14 and 17. The position information is inputted to the rear seat control unit 25. Based on the information, the amounts of sliding and the amounts of swinging of the first and second rear seats 14 and 17 are calculated.

ST05: the position information inputted to the rear seat control unit 25 shown in FIG. 2 is stored in the first memory 27a of the memory 27 as reproduction mode information. In this manner, the information of "normal mode" M1 of the first and second rear seats 14 and 17 is assigned as reproduction mode information to the first memory 27a for storage.

ST06: when the storage in the first memory 27a of the memory 27 is completed, the buzzer of the alarm unit 28 shown in FIG. 2 sounds, completing the storing process.

Next, an example of switching the current position mode of the first and second rear seats 14 and 17 into the reproduction position mode stored in the first memory 27a will be described with reference to the flowchart in FIG. 11.

ST10: to switch the position mode of the first and second rear seats 14 and 17 from "fully-flat mode" M2 to "normal mode" M1, the reproduction switch 41 of the memory switch 40 is turned on.

ST11: the position detection sensors 51, 52, 53, 55 and 56 shown in FIG. 1 detect the positions of the first and second rear seats 14 and 17 in the "fully-flat mode," the current position mode. The detected position information is inputted to the rear seat control unit 25.

ST12: the position information inputted to the rear seat control unit 25 is stored in the second memory 27b of the memory 27 as current position mode information ("fully-flat mode" information).

ST13: the information of the amounts of sliding and the amounts of swinging of the first and second rear seats 14 and 17 stored in the first memory 27a of the memory 27 of the rear seat control unit 25, that is, the reproduction mode information is read from the first memory 27a.

ST14: the first rear seat driving means 43 and the second rear seat driving means 44 shown in FIG. 2 are driven to switch from the current position mode stored in the second memory 27b into the reproduction position mode.

Next, with reference to the flowchart shown in FIG. 12, an example of returning the positions of the first and second rear seats 14 and 17 from the reproduction position mode to the current position mode will be described.

ST20: with the positions of the first and second rear seats 14 and 17 in "fully-flat mode" M2 as the reproduction position mode as described above, the return switch 41 of the memory switch 40 is turned on.

ST21: the current position mode information as the fully-flat mode stored in the second memory 27b of the memory 27 of the rear seat control unit 25 shown in FIG. 2 is read.

ST22: according to the current position mode information, the first rear seat driving means 43 and the second rear seat driving means 44 shown in FIG. 2 are driven to return the positions of the first and second rear seats 14 and 17 to the current position mode.

Figure 11:
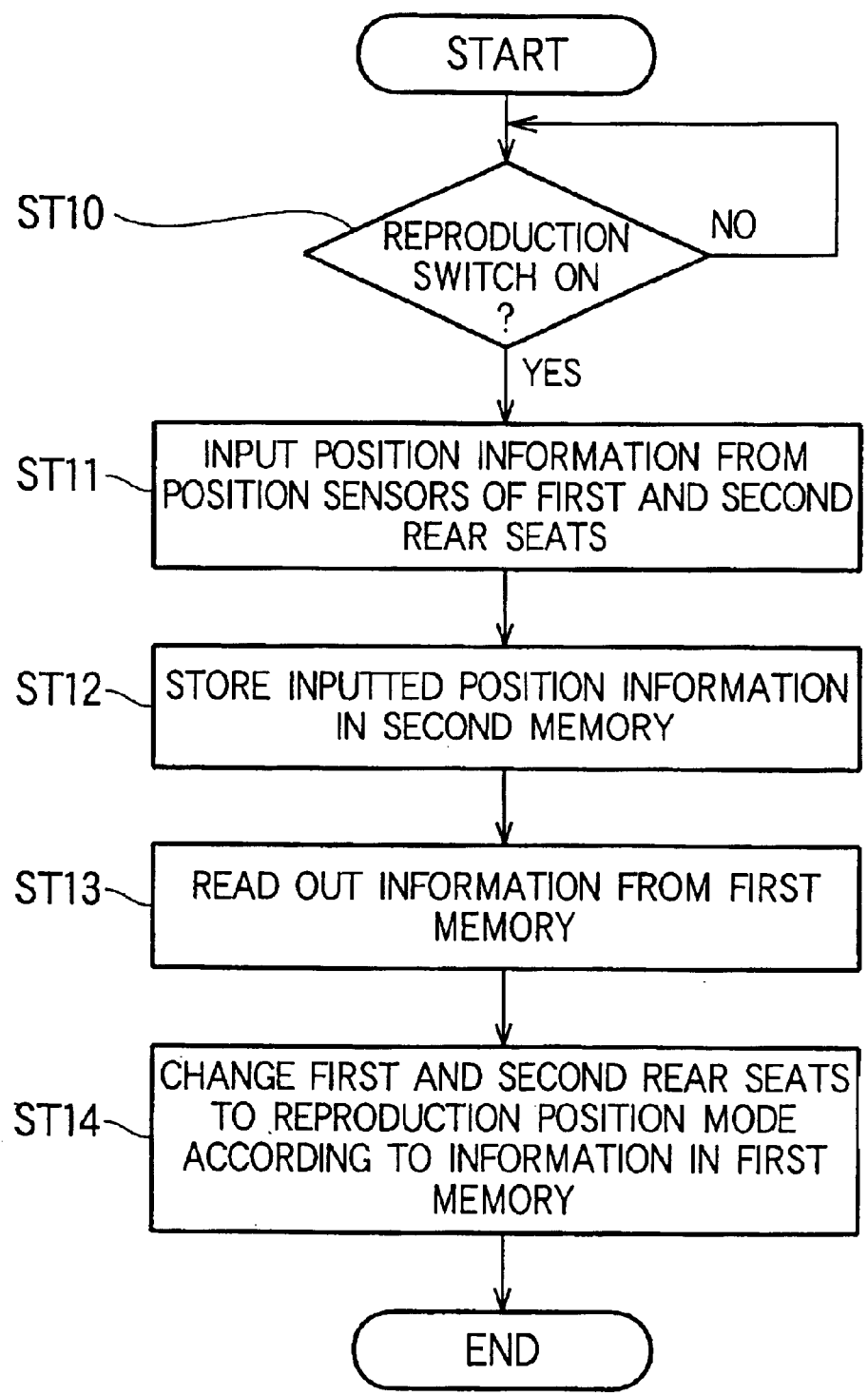
FIG. 11 is a flowchart illustrating an example of changing the position mode of the first and second rear seats with a reproduction switch of the memory switch.
Figure 12:
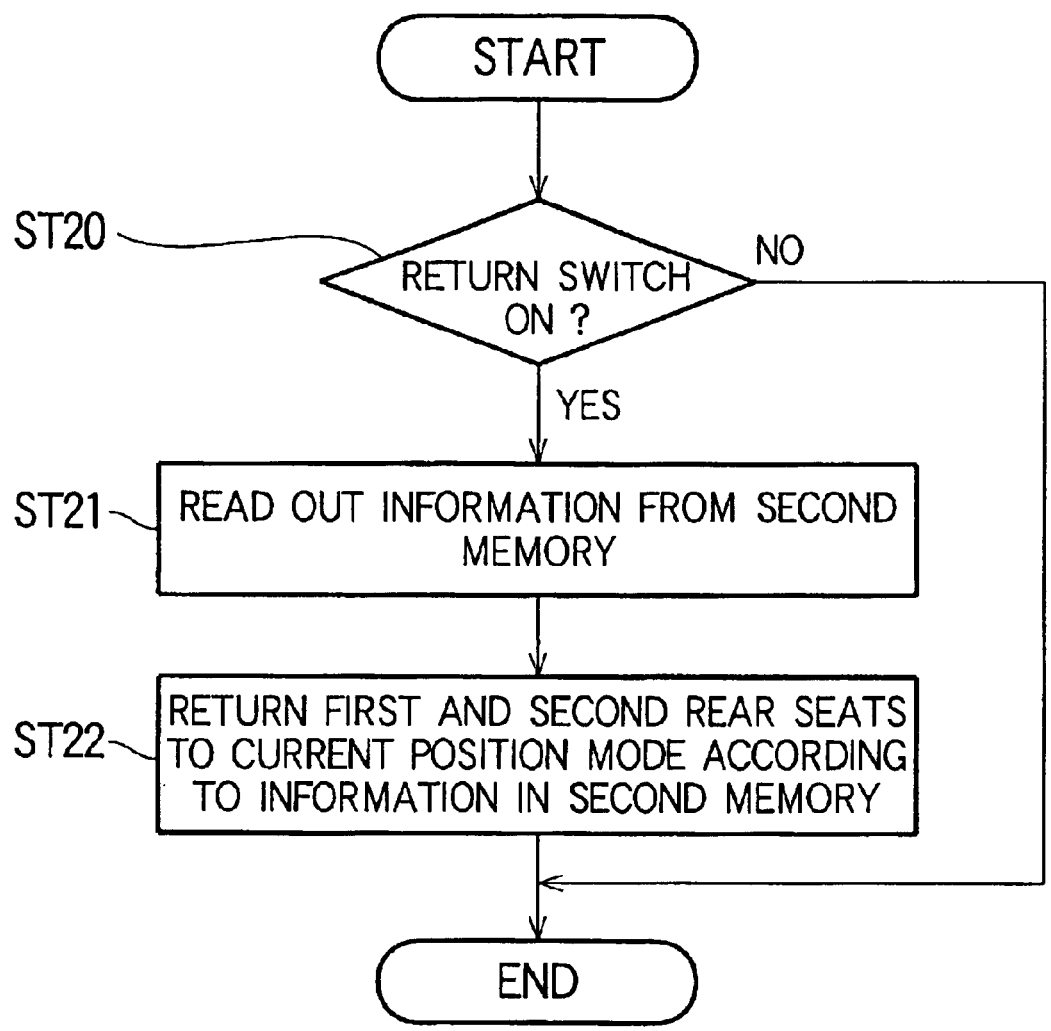
FIG. 12 is a flowchart illustrating an example of returning the first and second rear seats from the desired position mode to a current position mode with a return switch of the memory switch.

In FIGS. 10 to 12, the example of changing the first and second rear seats 14 and 17 from "fully-flat mode" M2 to "normal mode" M1 and returning from "normal mode" M1 to "fully-flat mode" M2 has been described with the current position mode of the first and second rear seats 14 and 17 as "fully-flat mode" M2 and the reproduction position mode as "normal mode" M1 by way of example. The current position mode and the reproduction position mode, however, are not limited thereto, and may be other position modes of M3 to M5.

Further, the current position mode and the reproduction position mode are not limited to position modes of M1 to M5 displayed on the display 21 shown in FIG. 4. Other position mode, that is, any position mode desirably set by a user may be used as the reproduction position mode.

Figure 13:
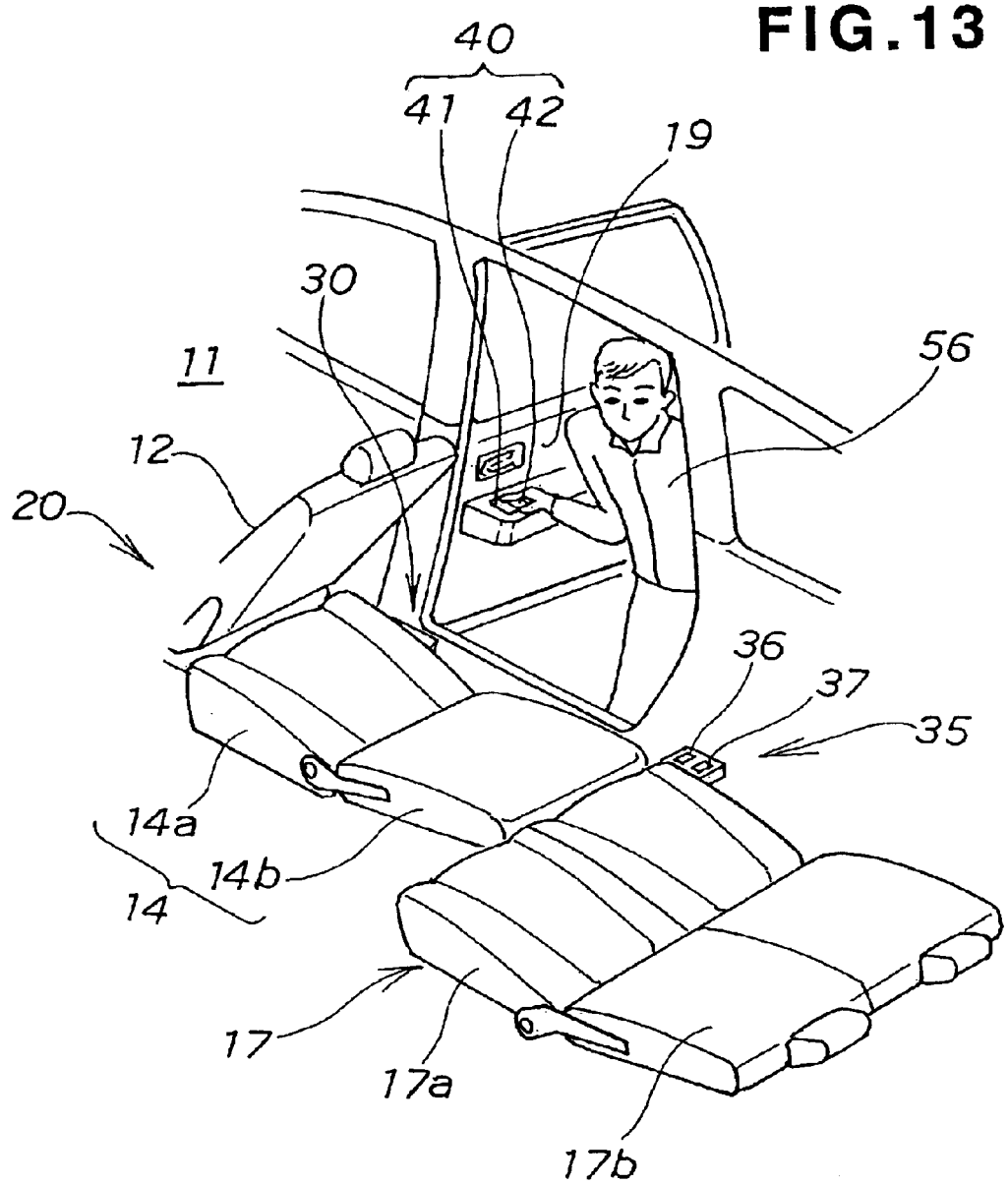
FIG. 13 is a perspective view illustrating an example of operating the memory switch of the first embodiment of the present invention.

As shown in FIG. 13, the memory switch 40 (reproduction switch 41 and return switch 42) is provided at the rear side door 19. The reproduction switch 41 and the return switch 42 can thus be provided in the vicinity of the first and second rear seats 14 and 17. The operator 56 can therefore easily check with his eyes the motions of the first and second rear seats 14 and 17 when changing the positions of the first and second rear seats 14 and 17 to the reproduction position mode or returning them to the current position mode, for example, operating the reproduction switch 41 or the return switch 42.

As described above, the first embodiment has been described with the example of providing the memory switch 40 at the rear side door 19. The mounting portion of the memory switch 40 is not limited thereto. The memory switch 40 may be mounted to the first or second rear seats 14 or 17, for example. The point is, the memory switch 40 may be mounted to any portion as long as being in the vicinity of the first and second rear seats 14 and 17.

Next, a second embodiment and a third embodiment will be described with reference to FIGS. 14, 15A and 15B. The second and third embodiments will be described with components identical to those in the first embodiment affixed identical reference numerals.

Figure 14:
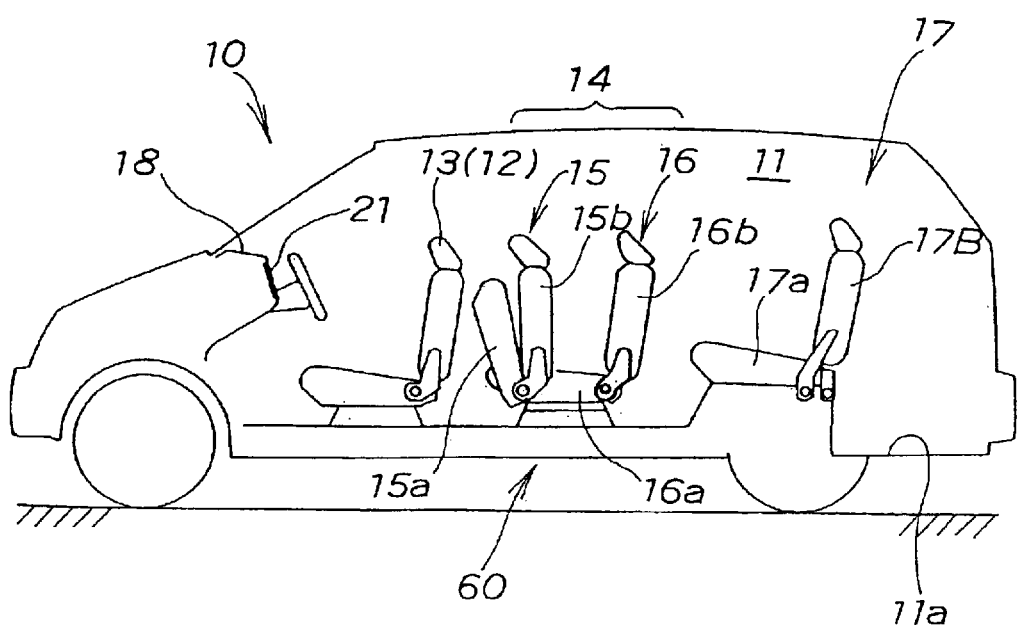
FIG. 14 is a side view of a vehicle having a rear seat position changing device according to a second embodiment of the present invention.

FIG. 14 illustrates a vehicle having a rear seat position changing device according to the second embodiment of the present invention. The second embodiment will be described with left and right seats 15 and 16 of a first rear seat 14 distinguished from one another.

A rear seat position changing device 60 of the second embodiment is different from that of the first embodiment only in that the left and right seats 15 and 16 of the first rear seat 14 are configured to operate individually, and is identical to that of the first embodiment in the other configuration.

More specifically, with the right seat 16 of the first rear seat 14 kept in the state of "normal mode" M1, a seat cushion 15a of the left seat 15 is swung rearward of the vehicle, thereby to fold the seat cushion 15a and a seatback 15b in a substantially V shape. The left seat 15 in this state is moved forward of the vehicle and stored in the vicinity of a passenger seat 13.

In this manner, the second embodiment can provide the same effects as the first embodiment. In addition, many position mode patterns of the first and second rear seats 14 and 17 can be prepared, allowing the selection of a desired position mode from among the many position modes. The first and second rear seats 14 and 17 can thus be selectably put in an optimum position mode appropriately for the use of a vehicle 10, resulting in further increased usability.

Figure 15A:
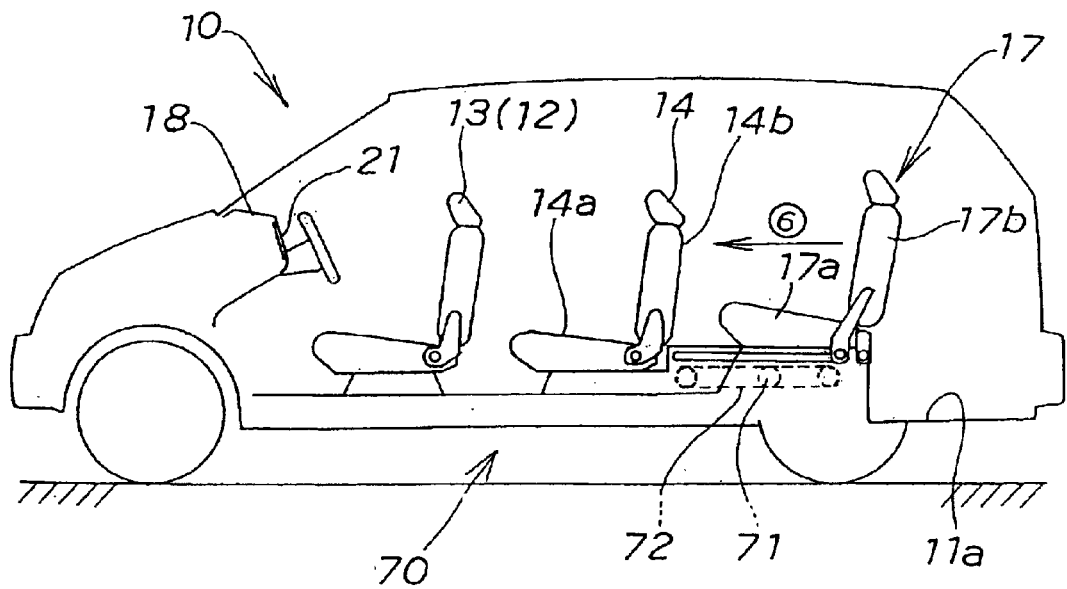
FIGS. 15A and 15B are side views of a vehicle having a rear seat position changing device according to a third embodiment of the present invention.
Figure 15B:
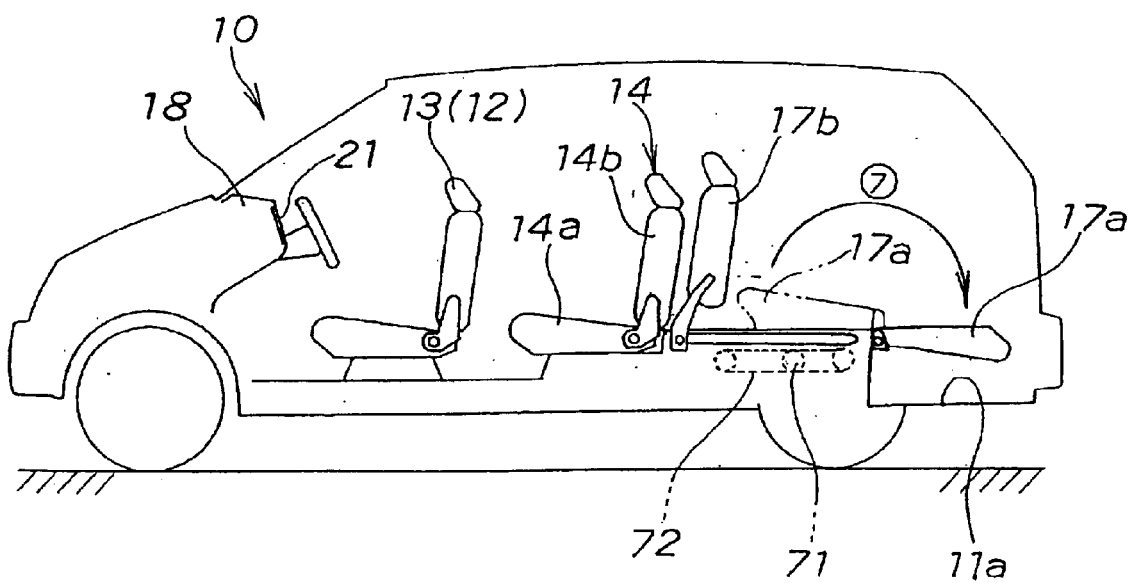
Figure 16:
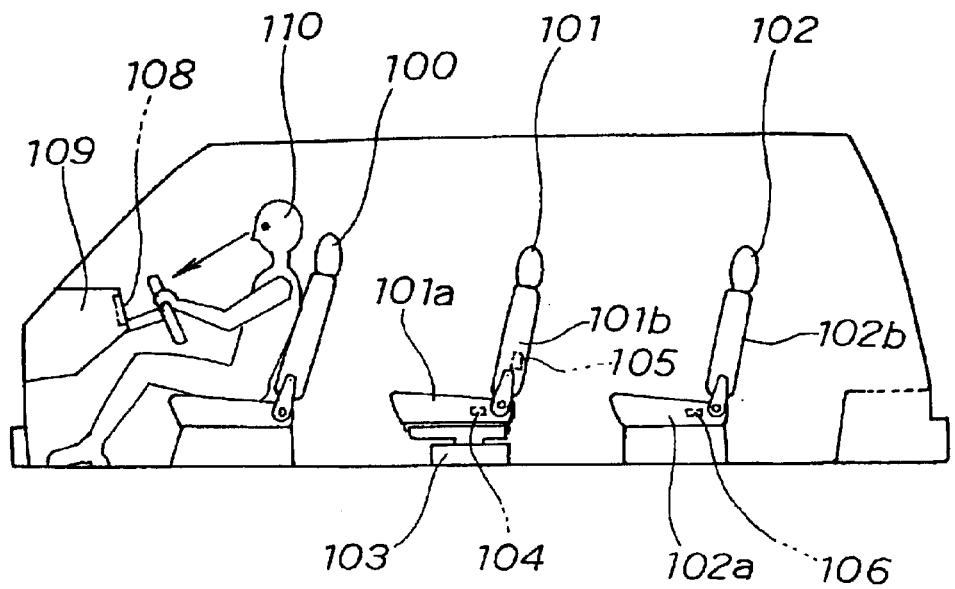
FIG. 16 is a side view of a vehicle having a conventional rear seat position changing device.

FIGS. 15A and 15B illustrate a vehicle having a rear seat position changing device according to the third embodiment of the present invention.

A rear seat position changing device 70 of the third embodiment shown in FIG. 15A is only different from that of the first embodiment in that a second rear seat 17 is configured to be slidable in a longitudinal direction of the vehicle, and is identical to that of the first embodiment in the other configuration.

The vehicle rear seat position changing device 70 has a second rear seat slide motor 71 connected to a chain 72 to drive the chain 72 with the second rear seat slide motor 71, thereby allowing a seatback 17b of the second rear seat 17 to slidingly move in a longitudinal direction of the vehicle. By use of this configuration, the seatback 17b of the second rear seat 17 is slidingly moved forward of the vehicle as shown by arrow ⑥.

In FIG. 15B, after the seatback 17b of the second rear seat 17 is moved in the vicinity of the rear surface of a seatback 14b of a first rear seat 14, a seat cushion 17a of the second rear seat 17 is swung rearward as shown by arrow ⑦ for storage in a depressed portion 11a. As described above, according to the third embodiment, as in the second embodiment, there are many position mode patterns of the first and second rear seats 14 and 17, allowing the selection of a desired position mode from among the many position modes. An optimum position mode of the first and second rear seats 14 and 17 can thus be selected according to the use of a vehicle 10, further increasing the usability.

Although the above embodiments have been described with the display 21 also serving as a display of a car navigator, they are not limited thereto. The display 21 may be provided independently of the car navigator.

The above embodiments have been described with the first and second rear seats 14 and 17 as multiple rows of rear seats. The number of rows of rear seats may be set desirably.

The present disclosure relates to the subject matter of Japanese Patent Application No. 2002-095530, filed Mar. 29, 2002, the disclosure of which is incorporated herein by reference in its entirety.

What is claimed is:

1. A rear seat position changing device for a vehicle with at least one row of rear seats arranged behind front seats, having actuators for changing a position of said at least one row of rear seats, having a plurality of sensors for detecting the position of said at least one row of rear seats, and having a control unit for controlling said actuators based on information from said sensors, said vehicle rear seat position changing device comprising:

a memory switch provided in a vicinity of said at least one row of rear seats; wherein,
when said at least one row rear seats is arranged in a desired position mode, said memory switch is operated to store information of said desired position mode detected by said plurality of sensors in said control unit as reproduction position mode information;
to change said at least one row rear seats from a current position mode to said desired position mode, said memory switch is operated to detect said current position mode with said plurality of sensors for storage in said control unit as current position mode information; and
said actuators are driven with said control unit in accordance with said reproduction position mode information stored in said control unit to change the position of said at least one row of rear seats from said current position mode to said desired position mode.

2. The rear seat position changing device as set forth in claim 1, wherein, to return said at least one row of rear seats from said desired position mode to said current position mode, said memory switch is operated to read said current position mode information stored in said control unit and drive said actuators with said control unit according to said current position mode information, thereby to return the at least one row of rear seats from said desired position mode to said current position mode.

3. The rear seat position changing device as set forth in claim 1, wherein said memory switch is provided inside of a rear side door of said vehicle.

4. The rear seat position changing device as set forth in claim 1, wherein said memory switch comprises a reproduction switch for changing said at least one row of rear seats from said current position mode to said desired position mode and a return switch for returning from said desired position mode to said current position mode.

5. A rear seat position changing device for a vehicle with a first rear seat and a second rear seat arranged behind front seats, having actuators for changing a position of at least one of said first and second rear seats, having a plurality of sensors for detecting a position of said at least on of said first and second rear seats, and having a control unit for controlling said actuators based on information from said sensors, said vehicle rear seat position changing device comprising:

a memory switch provided in a vicinity of said at least one of said first and second rear seats; wherein, when said at least one of said first and second rear seats is arranged in a desired position mode, said memory switch is operated to store information of said desired position mode detected by said plurality of sensors in said control unit as reproduction position mode information;

to change said at least one of said first and second rear seats from a current position mode to said desired position mode, said memory switch is operated to detect said current position mode with said plurality of sensors for storage in said control unit as current position mode information; and said actuators are driven with said control unit in accordance with said reproduction position mode information stored in said control unit to move said at least one of said first and second seats from said current position mode to said desired position mode.

6. The rear seat position changing device as set forth in claim 5, wherein, to return said at least one of said first and second rear seats from said desired position mode to said current position mode, said memory switch is operated to read said current position mode information stored in said control unit and drive said actuators with said control unit according to said current position mode information, thereby to return the at least one of said first and second rear seats from said desired position mode to said current position mode.

7. The rear seat position changing device as set forth in claim 5, wherein said memory switch is provided inside a rear side door of said vehicle.

8. The rear seat position changing device as set forth in claim 5, wherein said memory switch comprises a reproduction switch for changing said at least one of said first and second rear seats from said current position mode to said desired position mode and a return switch for returning from said desired position mode to said current position mode.

* * * * *